United States Patent [19]

Debenham

[11] 4,151,314

[45] Apr. 24, 1979

[54] METHOD OF LINING CONTAINER CLOSURES

[75] Inventor: Michael Debenham, Frankston, Australia

[73] Assignee: The Broken Hill Proprietary Company, Limited, Melbourne, Australia

[21] Appl. No.: 721,854

[22] Filed: Sep. 9, 1976

Related U.S. Application Data

[62] Division of Ser. No. 466,057, May 1, 1974, abandoned.

[30] Foreign Application Priority Data

May 1, 1973 [AU] Australia .............................. 3155/73

[51] Int. Cl.² ........................... B05D 1/26; B05C 7/00
[52] U.S. Cl. .................................... 427/239; 118/410; 427/287
[58] Field of Search ............... 427/230, 238, 235, 232, 427/239, 445, 234, 430, 435, 105, 439, 133, 135, 256, 287, 288; 118/421, 3, 410, 408, 411, 429; 425/809; 113/80 R; 228/37

[56] References Cited

U.S. PATENT DOCUMENTS

| | | | |
|---|---|---|---|
| 1,634,500 | 7/1927 | Hothersall | 427/239 |
| 1,865,830 | 7/1932 | Butler | 118/243 |
| 2,236,968 | 4/1941 | Cunnington | 118/421 X |
| 3,004,505 | 10/1961 | Dvorak | 118/410 X |
| 3,074,810 | 1/1963 | Timson | 118/408 X |
| 3,474,757 | 10/1969 | Dreher | 118/411 |
| 3,927,409 | 12/1975 | Kase et al. | 427/15 X |

Primary Examiner—Morris Kaplan
Attorney, Agent, or Firm—Murray and Whisenhunt

[57] ABSTRACT

This specification disclosed a method of and apparatus for the application of sealant gasketing or protective material to a can end or to other container members in which a transfer head having a transfer face in the shape of the container member area to be covered by the sealant is covered with sealant and the container member brought into contact with at least the sealant on the transfer face to achieve transfer of the sealant to the container member. In one form the transfer head has a passage opening to the transfer face through which sealant is pumped to cover the transfer face. In another form the transfer head is arranged to be immersed in a tank of sealant to cover the transfer face with sealant.

7 Claims, 3 Drawing Figures

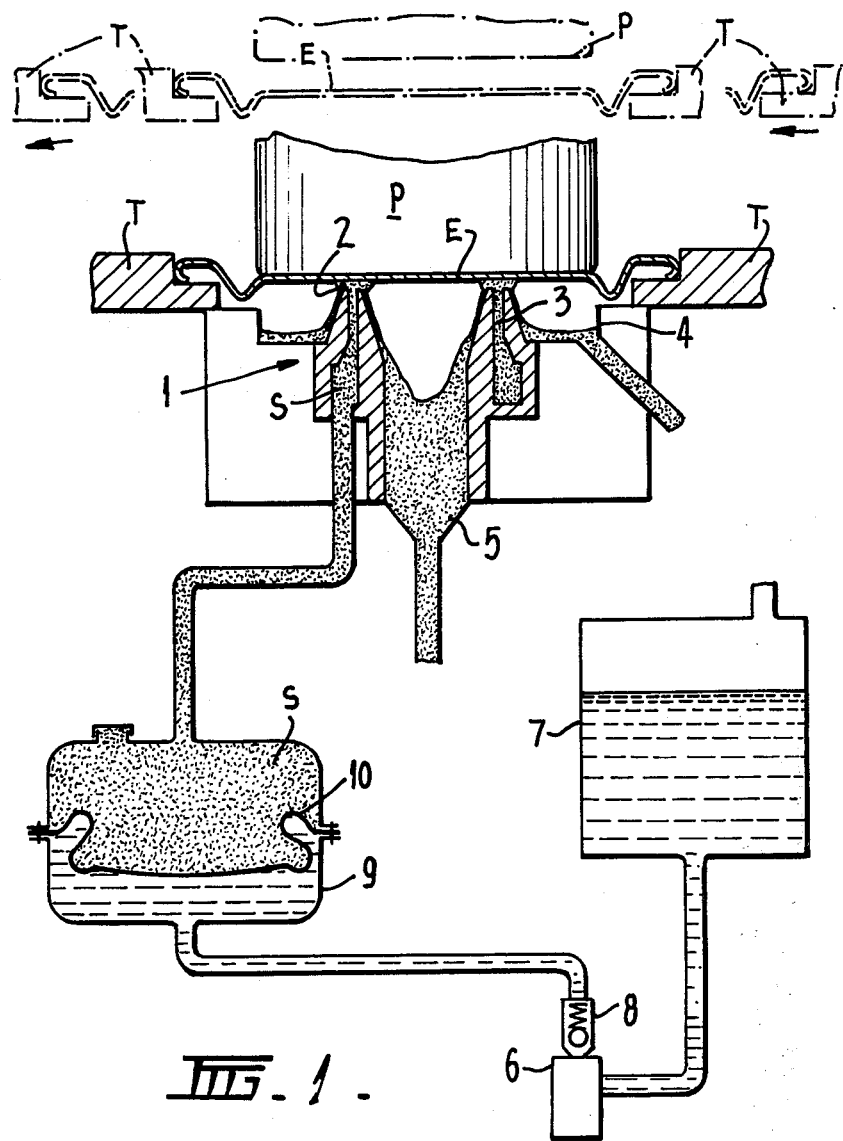
FIG_1.

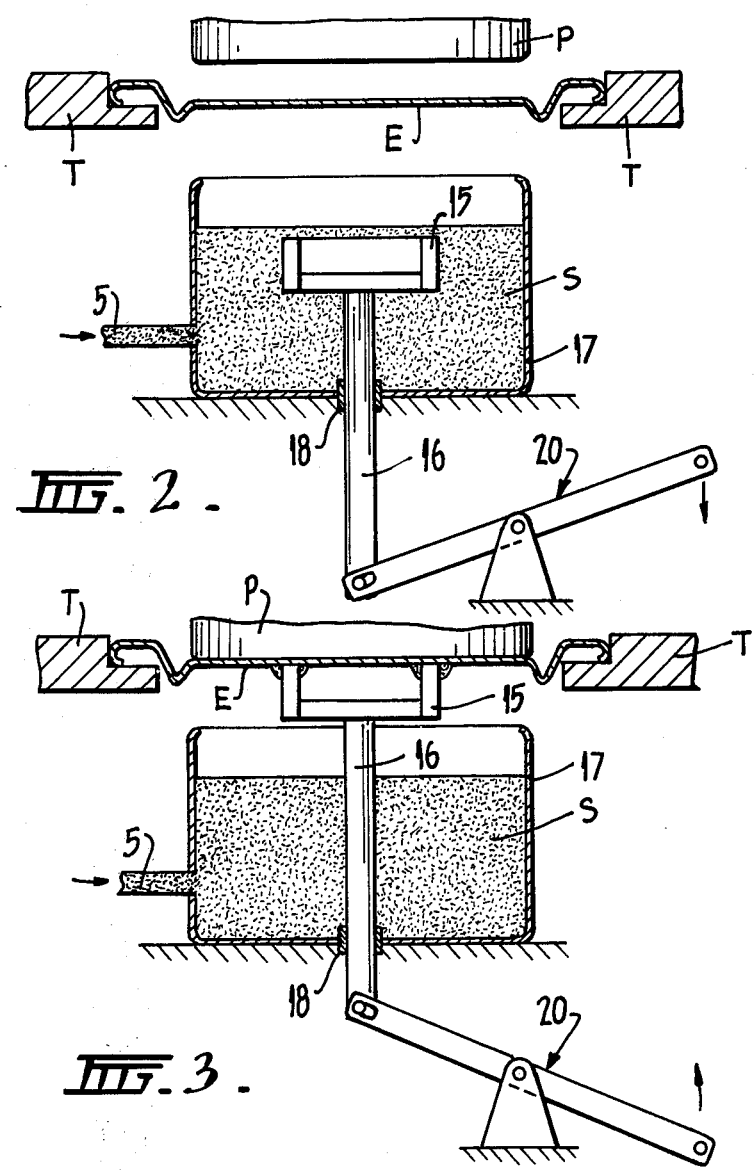

METHOD OF LINING CONTAINER CLOSURES

This is a division of application Ser. No. 466,057 filed May 1, 1974 now abandoned.

This invention relates to an improved method for the application of sealant, gasketing or protective material to can ends and other container members.

Several different forms of easy-opening closure wherein the closure is partially sheared from the container member are known. Where containers incorporating such closures are used for liquids or for goods for consumption, it is generally necessary to hermetically seal the closure by applying sealant to the inside face of the end surrounding the periphery of the closure. The application of sealant prevents gas leakage in the case of carbonated beverages and assists in preventing accidental opening of the closures. It also protects the raw metal edge against corrosion and for this purpose a repair lacquer may also need to be applied to the outside face of the end.

One of the problems faced by can makers is the proper application of controlled amounts of sealant to the ends at production line speeds. Most of the methods for the application of sealant so far developed suffer from disadvantage of lack of control over the amount and/or location of sealant on the end.

In one aspect, the present invention provides a method of applying sealant gasketing or protective material (hereinafter called "sealant") to a container member comprising locating the container member in alignment with a transfer head having a transfer face at least in the shape of the container member area to be covered by the sealant, covering said transfer face with sealant, and bringing the container member and at least the sealant on the transfer face into contact to transfer the sealant thereon to the container member.

Preferred forms of the invention will now be described with reference to the accompanying drawings in which:

FIG. 1 is a diagrammatic representation of a sealant applicator system embodying the invention;

FIG. 2 is a diagrammatic representation of an alternative form of sealant applicator embodying the invention, and FIG. 3 shows the embodiment of FIG. 2 in the sealant transfer position.

Both of the embodiments shown in the drawings have been designed for the application of narrow annular bands of sealant, such as a plastisol, to cover the edges of push-in easy opening closures in a can end. In each case the sealant applicator is positioned in one of the press stages of a known rotary or linear transfer press having a movable transfer means T for locating successive can ends E in each press stage. The transfer means T operates to move the ends E between stages, the transfer means being lowered, about one-fourth inch, from the transfer position to the press operation position and raised again after the press member P has been lowered at each stage to perform a die operation on the end.

In the present case, the press member P pushes the end down to achieve sealant transfer.

The sealant applicator system shown in FIG. 1 comprises a sealant transfer head 1 having an annular transfer face 2 to which sealant S is pumped through a continuous annular passage 3 opening to the face 2. The transfer head 1 has a generally tubular shape and a sealant overflow trough 4 surrounds the outer periphery of the head 1 while the overflow at the inner periphery of the head is collected by a trough 5 closing the lower end of the tubular head body. The collected sealant is led away from the head as shown for disposal or reuse.

The pumping of sealant is a problem for two reasons: very few types of pumps will operate accurately and consistently at the small flow rates required and since the sealant is abrasive and viscous, known pumps will not operate for long before requiring repair. For these reasons it was necessary to devise an alternative pumping system that would avoid these problems.

The pumping system shown is very simple but is extremely reliable and accurate at small flow rates. It comprises a small volume positive displacement pump 6 of any suitable type having its inlet connected to a tank 7 of oil or other suitable working liquid. The outlet of the pump 6 is connected via a non-return valve 8 to displacement transfer vessel 9 having two halves separated by a flexible diaphragm 10. The vessel 9 contains a closed supply of sealant S on the opposite side of diaphragm 10 to the oil and an outlet for the sealant is connected to the sealant transfer head 1 as shown.

Thus for each oil displacement performed by the pump 6 a corresponding volume of sealant is displaced from the vessel 9 to the transfer head 1 where it flows over the transfer face 2. The displacement of pump 6 is preferably controlled so that there is always an excess of sealant S at the transfer face 2 during operation of the system. However, the pump 6 may be controlled so that the replacement sealant equals the sealant transferred to the end. Because of its viscous nature, the sealant S forms a relatively large meniscus on the transfer face 2 thus presenting a suitable volume of sealant ready for transfer to a can end E.

In use, the transfer means T lowers an end E into the press stage housing the sealant applicator and the press member P pushes the end E into close proximity with the transfer head 1. It is not necessary or desirable for the end to contact the transfer face 2 since adequate sealant is transferred simply by the end contacting the meniscus of sealant S, as shown in FIG. 1. If the transfer face 2 is wiped of sealant it is found that the even build up of sealant over the whole of the face may be much slower and less certain than if a small amount of sealant is left on the face.

A prototype form of the above described system has been tested applying sealant to a paper tape. The transfer head had two spaced annular transfer faces about 9/16 inch and 5/16 inch in diameter, and one-eighth inch wide suitable for applying sealant about 0.015 inch thick to an end having two push-in closures of similar diameters. A spacing of 0.010 inch between the tape and transfer face was found to satisfactorily transfer the required amounts of sealant. The positive displacement pump used was a Diesel fuel injection pump adjusted to pump oil at approximately 12 ml/min. It was found that sealant was cleanly and accurately transferred at rates of up to 350 sealant transfers/min. and it is believed that the system could achieve rates considerably higher than this without reduction in quality. In this prototype, the oil was heated and was circulated through the transfer head to make the sealant more readily flowable. In a production model it is envisaged that electric heating coils may be inserted in the head to achieve the same result.

In the alternative embodiment shown in FIG. 2, the transfer head 15 is fixed to the end of a shaft 16 which is vertically reciprocable by means of a mechanism schematically represented by 20. The shaft 16 and head 15 are adapted to be immersed in a tank 17 of sealant S at the bottom of the shaft stroke and the shaft 16 is supported by a bearing/seal 18 in the bottom of the tank 17. At the top of the shaft stroke the transfer head 15 is arranged to contact the can end E as the press member pushes down on the end E.

The mechanism 20 is controlled so that as a new end is being transferred to the die stage housing the sealant applicator, the transfer head 15 is immersed in the sealant to load its face with sealant. Since the position of the transfer head 15 at the bottom of the shaft stroke is relatively fixed, the sealant S must be maintained at a level above the head 15 in this position. Sealant pumping means (not shown), such as the pumping system of FIG. 1, are provided to replenish the sealant S in the tank 17 after each operation at a controlled rate corresponding to the rate of removal of sealant from tank 17 by the transfer head. Alternatively, the pump may maintain the sealant S at an overflow level in the tank 17.

The operation of this embodiment is basically the same as the previous embodiment only the transfer head 15 is reciprocated in timed relationship with the press member P so that the head 15 is at the top of its stroke and contacts the end E as the press member P pushes the end E down. The head 15 is lowered as the end E is lifted off the press stage. Once again clear and accurate sealant transfer is achieved. It will be appreciated that contact between the end and transfer face is not necessary and transfer will be achieved by contact between the end and the sealant on the transfer face.

The connection between the shaft 16 and the reciprocating mechanism 20 may include resilient means that is compressed to absorb the small downward movement of the shaft 16 under the force applied to the end E by the press member P. Alternatively, the press member P may be resiliently faced to achieve the same result.

The sealant supply shown may be replaced by a supply system of the type shown in FIG. 1, that is, a sealant pumping system feeding sealant to a passage in head 15 which opens to the transfer face. In such an arrangement, the transfer face may be covered by an absorbent material or by flexible lips forming the face. During the sealant transfer operation the sealant is squeezed from the absorbent material or the lips deflected to discharge the sealant onto the end or other article.

While the sealant pumping system described in relation to FIG. 1 is most preferred, it may be modified by replacing the positive displacement pump by a pressurized oil supply connected to the displacement transfer vessel 9 via a flow control valve if necessary. Similarly, the system may be replaced by a sealant pump discharging through a flow control valve to the transfer head.

While the preferred forms have been described in relation to the application of sealant, the invention is also applicable to the application of gasket liner material to the can end. At present this material is applied by a process involving spinning of the end thus requiring a separate operation after the last press stage. Using the present apparatus in any one of its forms a tubular transfer head having a transfer face of the required dimensions is used to transfer a band of gasketing material of the required thickness to the can end. Where the end has a closure, a further transfer head may be incorporated in the same press stage or in a previous or subsequent stage.

Where the system is used to apply repair lacquer to the top of a can end, the end may be inverted prior to this operation.

I claim:

1. A method of applying a substantially uniform amount of sealant to a container member comprising continuously supplying an amount of sealant in excess of that required to cover an area of the container member to an upward facing sealant transfer face having at least two sides and a configuration corresponding to said area, removing said excess sealant from at least two sides of said transfer face to provide a substantially uniform amount of sealant available to be applied to said container member, and causing contact between said container member and said sealant on said transfer face to cover said area of said container member with the substantially uniform amount of sealant.

2. Method according to claim 1, wherein said sealant is pumped to said sealant transfer face to form an enlarged meniscus of sealant on said face.

3. Method according to claim 1, wherein said container member is brought into close proximity with said sealant transfer face but not in contact therewith to transfer a major proportion of the sealant on said face to said container member while leaving said face wet with sealant.

4. Method of claim 1, wherein said excess sealant is removed by permitting same to flow away from said transfer face.

5. Method according to claim 4, wherein said sealant covers an annular area of said sealant transfer face, and said excess sealant is removed from outside of and inside of the annular area covered by said sealant.

6. Method of claim 5, wherein said container member is located above said sealant transfer head and in alignment therewith, and said contact is caused by moving said container member downward into contact with said sealant.

7. A method of applying a substantially uniform amount of sealant to the edges of push-in easy-opening closures in can ends, comprising continuously supplying an amount of sealant in excess of that required to cover said edges to an upward facing sealant transfer face having at least two sides and a configuration generally corresponding to the area, including said edges, of a can end to be covered, periodically contacting the sealant on the transfer face with a can end to cover said area of the can end with a substantially uniform amount of sealant, and removing excess sealant from at least the two sides of the transfer face at least during periods between contact of said sealant with successive can ends in order to make a substantially uniform amount of sealant available for each can end.

* * * * *